US006660813B2

(12) United States Patent
Wagener et al.

(10) Patent No.: US 6,660,813 B2
(45) Date of Patent: Dec. 9, 2003

(54) SOLID STATE METATHESIS CHEMISTRY (75) Inventors: Kenneth B. Wagener, Gainesville, FL (US); Stephen E. Lehman, Jr., Gainesville, FL (US); Garrett W. Oakley, Gainesville, FL (US); Jason A. Smith, Gainesville, FL (US)

(73) Assignee: University of Florida, Gainesville, FL (US)

( * ) Notice: Subject to any disclaimer, the term of this patent is extended or adjusted under 35 U.S.C. 154(b) by 0 days.

(21) Appl. No.: 10/210,227

(22) Filed: Aug. 1, 2002

(65) Prior Publication Data

US 2003/0027962 A1 Feb. 6, 2003

Related U.S. Application Data (60) Provisional application No. 60/309,894, filed on Aug. 3, 2001.

(51) Int. Cl.$^7$ ............................. C08F 2/36; C08G 61/06
(52) U.S. Cl. ..................... 526/71; 526/170; 526/171; 526/285; 526/308; 526/336; 526/902; 585/365; 585/366; 585/367; 585/643; 585/940
(58) Field of Search ................. 526/71, 170, 171, 526/285, 308, 336, 902; 585/365, 366, 367, 643, 940

(56) References Cited

U.S. PATENT DOCUMENTS

| | | |
|---|---|---|
| 3,697,616 A | 10/1972 | McDonough et al. |
| 5,519,101 A | 5/1996 | Nubel et al. |
| 5,808,126 A | 9/1998 | Brzezinska et al. |
| 5,847,064 A | 12/1998 | Wagener et al. |
| 6,107,237 A | 8/2000 | Wagener et al. |
| 6,177,464 B1 | 1/2001 | Cuny et al. |
| 6,448,367 B1 | 9/2002 | Akieda et al. |

OTHER PUBLICATIONS

Watson et al, Solvent–Free Olefin Metathesis Depolymerization of 1,4–Polybutadiene, Macromolecules 33(5), 1494–1496; Web Release Date: Feb. 5, 2000.*

Bässler, H. "Photopolymerization of Diacetylenes" Advances in Polymer Science 63, (1984) pp. 2–90.

Ulman, et al., "Ruthenium Carbene–Based Olefin Metathesis Initiators: Catalyst Decomposition and Longevity", J. Org. Chem. 1999, 64, pp. 7202–7207.

Lehman, et al., "Solid State Metathesis Chemistry" A Presentation at ISOM XIV, Aug. 5–9, 2001, pp. 2–50.

* cited by examiner

*Primary Examiner*—Fred Teskin
(74) *Attorney, Agent, or Firm*—Akerman Senterfitt (57) ABSTRACT

An in-situ method for performing organic metathesis polymer chemistry in the solid state includes the step of providing an organic monomer and a catalyst, the catalyst for driving a metathesis polymerization reaction of the monomer. The organic monomer can be provided as a liquid monomer. The reaction produces reaction products including a polymeric end product and at least one volatile reaction product. At least a portion of the volatile reaction product is removed during the reaction to favor formation of the reaction product. Significantly, the reaction is performed at a temperature being below an average melting point of the polymeric end product such that at least a portion of the reaction is performed in the solid phase.

33 Claims, 8 Drawing Sheets

Acyclic Diene Metathesis (ADMET)

Ring Closing Metathesis (RCM)

Ring Opening Metathesis Polymerization (ROMP)

Selective Cross Metathesis

SOLID STATE METATHESIS CHEMISTRY

CROSS REFERENCE TO RELATED APPLICATION

The present application claims the benefit of U.S. provisional patent application No. 60/309,894 filed on Aug. 3, 2001, the entirety of which is incorporated herein by reference.

STATEMENT REGARDING FEDERALLY SPONSORED RESEARCH

This invention was made with United States Government support awarded by the National Science Foundation, Division of Materials Research, Grant No. NSF-DMR-9806492. The United States Government has certain rights in this invention.

FIELD OF THE INVENTION

This invention relates generally to metathesis chemistry. More particularly, it relates to organic metathesis chemistry.

BACKGROUND OF THE INVENTION

Chemical reactions are generally performed in the liquid state, either in solution or in the melt. Liquid state chemistry is performed as a matter of expediency since the reactivity of end groups is enhanced in the liquid state as compared to the solid state.

Solid-state chemistry is known both in the single crystal as well as the semicrystalline solid-state array. For example, it has been demonstrated that single crystal to single crystal solid-state polymerization can occur in the case of diacetylene polymerization chemistry. In this case, no catalyst is present during the reaction but rather the reaction is initiated with light which converts monomer to polymer structures within the single crystal itself. Although a number of factors contribute to the occurrence of this chemistry, the principal factor is proximity. These are known as topological reactions and they exist in both small molecule as well as macromolecular chemistry. The reactions are relatively slow, yet the degree of order that exists in the molecules formed that have been studied is generally high.

Solid-state polymerization has also been demonstrated for systems which are catalyzed and results in condensation products. For example, polycondensation reactions which are conducted in the solid state can be combined with standard melt polymerization to produce well-known commercial molecules, such as polyester and nylon. However, reaction temperatures for these condensation reactions are typically 150° C. or more. This process is often referred to as "post condensation" and increases the average molecular weight of the molecules after the initial standard melt polymerization.

To date, solid state polycondensation reactions have been performed at high temperature because high temperature has been needed to facilitate the release of the small molecule that is produced, such as water, ethylene glycol, and the like from the solid state. The nature of the solid-state polymerization reaction is not fully understood though it is thought to be either the result of the diffusion of the small molecule out of a solid-state matrix or diffusion of a functional group from the center of the solid state matrix to its surface. Regardless of the mechanism, the reaction proceeds under relatively slow kinetics producing a high molecular weight structure.

Recently, metathesis chemistry has received much attention as a method to obtain precise structure control in polymer synthesis. Metathesis reactions involve an exchange, substitution, or replacement of atoms and radicals and are sometimes referred to as double dissociation reactions. Recent advances include the synthesis of polyolefin and polyolefin-like polymers through two-step procedures involving (1) acyclic diene metathesis (ADMET) polymerization or ring-opening metathesis polymerization (ROMP) followed by hydrogenation.

Figure 1:
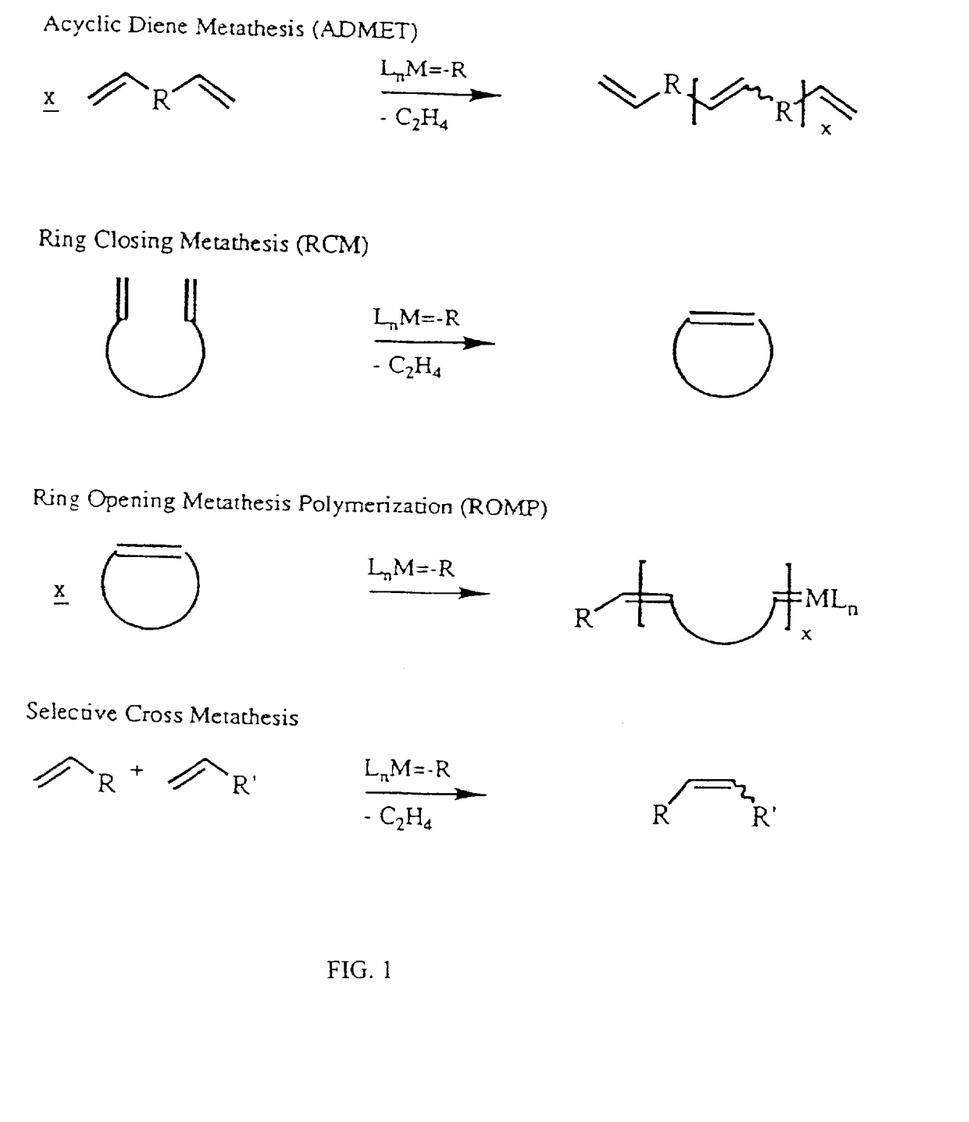
FIG. 1 illustrates various metathesis reactions.

FIG. 1 shows some examples of metathesis reactions, such as acyclic diene metathesis (ADMET) and ring closing metathesis (RCM), ring opening metathesis (ROMP) and selective cross metathesis. As shown in FIG. 1, $L_nM=-R$ represents any metathesis catalyst (which are well known in the art) where Ln represents a ligand set, M represents a transition metal, and –R represents a hydrocarbon group. Further, R represents any functionality which does not deactivate the metathesis catalyst. All of these metathesis reactions can be useful for constructing molecules.

Currently, metathesis polymerization reactions and organic metathesis reactions forming small molecules require that a liquid state be achieved. In the case of metathesis polymerization reactions, the reaction proceeds via melt polymerization, often with the addition of other chemicals, such as solvents. It would be advantageous for metathesis to be performed at least in part in the solid state, allowing advantages associated with the use of low reaction temperatures (e.g. longer catalyst life) and solvent-less in-situ processing.

SUMMARY

An in-situ method for performing organic metathesis polymer chemistry in the solid state includes the step of providing an organic monomer and a catalyst, the catalyst for driving a metathesis polymerization reaction of the monomer. The organic monomer can be provided as a liquid monomer. The reaction produces reaction products including a polymeric end product and at least one volatile reaction product. At least a portion of the volatile reaction product is removed during the reaction to favor formation of the reaction product. Significantly, the reaction is performed at a temperature being below an average melting point of the polymeric end product such that at least a portion of the reaction is performed in the solid phase. The reaction can comprise polycondensation metathesis chemistry (ADMET).

Volatile reaction product can be removed by passing an inert gas to carry away the volatile reaction product or applying a vacuum to remove the volatile reaction product.

The invention can be used with a variety of catalysts. For example, the catalyst can be a first generation Grubbs' catalyst, a second generation Grubb's catalyst, a Van der Schaaf catalyst or Schrock's catalyst.

The reaction can be performed at a pressure of no more than approximately 1 atmosphere and at a temperature of no more than approximately 80° C., preferably no more than approximately 50° C., more preferably at a temperature of no more than approximately 30° C. The reaction can be performed at a temperature above the glass transition temperature of the end product.

An in-situ method for forming cyclic molecules by metathesis chemistry in the solid state includes the steps of providing a non-ringed reagent and a catalyst, the catalyst for driving a ring closing metathesis reaction of the reagent, wherein the reaction produces a solid cyclic product and at least one volatile reaction product. At least a portion of the volatile reaction product is removed during the reaction to favor formation of the solid cyclic product. The reaction is performed at a temperature below a melting point of the cyclic product such that at least a portion of the reaction is performed in the solid phase. The reaction temperature can be no more than approximately 80° C., preferably no more than approximately 50° C., more preferably at a temperature of no more than approximately 30° C.

An in-situ method for performing organic ring opening metathesis polymer (ROMP) chemistry in the solid state includes the steps of providing an organic ringed monomer and a catalyst, the catalyst for driving a metathesis polymerization reaction of the monomer, wherein the reaction opens the ringed monomer and forms a polymeric end product. The reaction is performed at a temperature below an average melting point of the polymeric end product such that at least a portion of the reaction is performed in the solid phase.

The reaction temperature can be no more than approximately 80° C., preferably no more than approximately 50° C., more preferably at a temperature of no more than approximately 30° C.

A method for in-situ polymerization by metathesis chemistry in the solid state includes the steps of providing a monomer and a catalyst for driving a metathesis polymerization reaction of the monomer on a surface, the monomer forming an intractable polymer during solution polymerization, wherein the reaction produces reaction products including a polymeric end product and at least one volatile reaction product. At least a portion of the volatile reactant product is removed during the reaction to favor formation of the polymeric end product. The reaction can be performed at a temperature below an average melting point of the polymeric end product such that at least a portion of the reaction is performed in the solid phase.

The surface used for polymerization can comprises a mold and further comprising the step of casting the polymeric end product. The monomer can be phenylene vinylene.

The reaction temperature can be no more than approximately 80° C., preferably no more than approximately 50° C., more preferably at a temperature of no more than approximately 30° C. The reaction can be performed at a temperature above the glass transition temperature of the polymeric end product.

A method for solid state metathesis polymerization includes the steps of providing an organic monomer having double or triple bonded end groups together with a metathesis catalyst having the formula LnM=–R, wherein Ln represents a ligand set, M represents a transition metal, and –R represents a hydrocarbon group, polymerizing the monomer, where the polymerization reaction produces a polymeric end product and at least one volatile reaction product. The reaction is performed at a temperature below an average melting point of the polymeric end product such that at least a portion of the polymerization is performed in the solid phase. The polymerization can be performed in-situ. The monomer can be a liquid monomer. The reaction temperature can be no more than approximately 80° C., preferably no more than approximately 50° C., more preferably at a temperature of no more than approximately 30° C.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

The invention provides a method for organic solid state metathesis, capable of operating at temperatures lower than otherwise possible. The method may be performed in-situ to form polymers created by metathesis reactions such as acyclic diene metathesis (ADMET), ring closing metathesis (RCM), ring opening metathesis (ROMP), and selective cross metathesis reactions.

The reaction method generally involves combining at least one organic reagent having at least one double or triple bond together with a metathesis catalyst having the formula LnM=–R, where Ln represents a ligand set, M represents a transition metal, and –R represents a hydrocarbon group, to produce a solid end product. At least a portion of the reaction is performed in the solid state. For example, when the solid end product is an amorphous polymer, the reaction temperature is below an average melting point and generally above the glass transition temperature of the polymer. Thus, the metathesis reaction can be performed in-situ and without a solvent.

In ADMET, RCM and selective cross metathesis, the respective reactions produce reaction products which include a solid reaction product and a volatile reaction product. When a volatile product is formed by the reaction, removing at least a portion of the volatile product that is evolved by the reaction can be used to help shift the equilibrium of the reaction to favor formation of the solid reaction product.

For example, flowing an inert gas such as nitrogen or argon can be used to remove the volatile compound released (e.g. ethylene), pushing the reaction equilibrium to form additional desired solid product(s). Alternatively, other methods which remove volatile products, such as a vacuum, can be used for the same purpose. Removal of the condensate, low molecular weight volatile condensation reaction product, in this case ethylene, aids formation of high molecular weight polymers using solid state metathesis.

In the case of ROMP, where no small volatile molecule is evolved, the reaction may be driven by relieving ring strain resulting from the ring opening reaction leading to the ROMP reaction product. Removal of ring strain can evolve heat which may itself drive the ROMP reaction permitting room temperature, or a near-room temperature ROMP reaction.

Using the invention, metathesis can be performed at temperatures lower than otherwise possible. For example, metathesis can be performed at room temperature (25 to 30° C.) or near-room temperature. Lower temperature metathesis provides process efficiencies, such as energy savings, shorter process times and may extend the useful lifetime of certain catalysts.

The reaction is initiated and proceeds with little or no stimulation. Thus, beside the reaction not requiring heat beyond that which is provided by room temperature, the reaction does not generally require any light or any other external energy supplied to drive the reaction.

In the case of metathesis polymerizations such as ADMET and ROMP, the polymerization can begin in solution and continue to proceed after the growing polymer reaches the solid state. Solidification of the growing polymer occurs because the growing macromolecule crystallizes to produce a semi-crystalline solid state polymer. This semi-crystalline solid state then can continue to polymerize without any added stimulus, such as heat or light.

Solvents also are not generally necessary in using the invention unless products and/or reactants possess physical properties which limit their intimate contact with the catalyst. Accordingly, the invention can offer higher product yield and higher purity because solvent is generally not necessary and the reaction can proceed in a single step. Single step reactions minimize or even substantially eliminate side reactions which can reduce product yield.

In the case of ADMET metathesis, suitable monomers generally include those monomers having double or triple bonded end groups. For example, 1,9 decadiene includes two end double bonds. Other examples of suitable ADMET monomers include the numerous monomers currently used in conventional ADMET metathesis.

Figure 2:
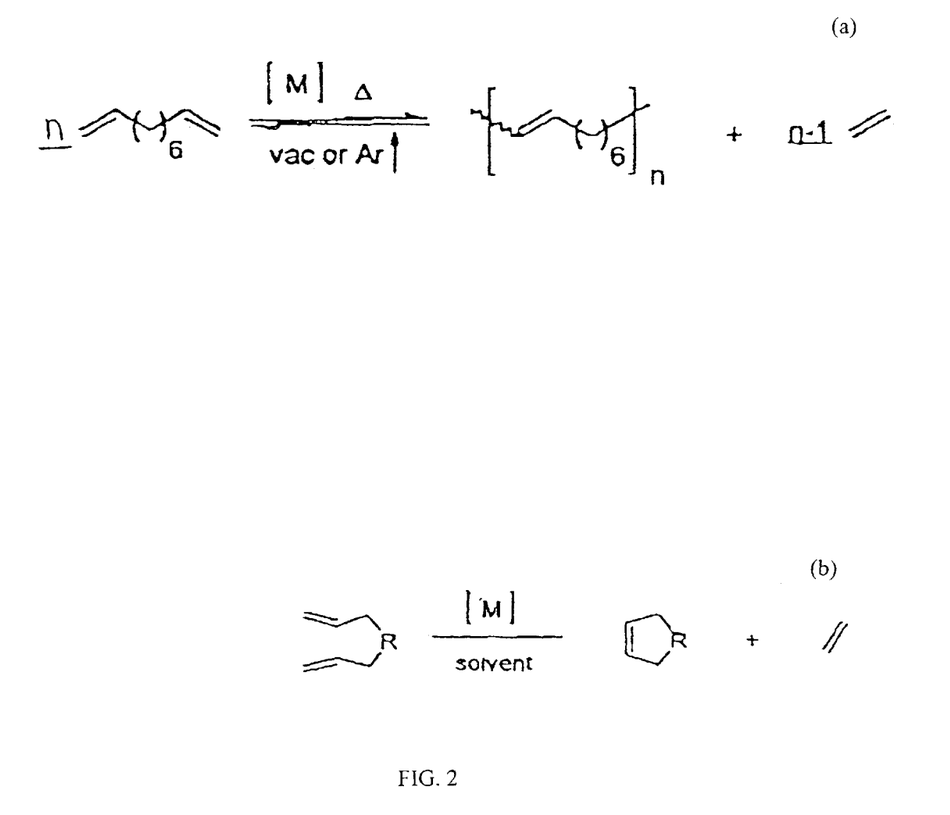
FIG. 2(a) illustrates a solid state metathesis reaction polymerizing the monomer 1,9 decadiene.
FIG. 2(b) illustrates a ring closing metathesis reaction.

FIG. 2(a) shows a polymerization of the diene monomer 1,9 decadiene to its polymer via ADMET polycondensation chemistry. In this reaction, ethylene is evolved. The reaction shown proceeds at temperatures as low as room temperature under a flowing inert gas such as argon or nitrogen, or with an applied vacuum to remove the ethylene evolved by the reaction.

The monomer 1,9 decadiene is a liquid at room temperature (25° C.) and one atmosphere pressure. Initially, the liquid monomer and the catalyst are combined, the catalyst comprising a small percentage of the resulting mixture. All manipulations of reagents and materials were completed under inert, dry atmospheres.

FIG. 2(b) illustrates an exemplary ring closing metathesis (RCM) reaction. In this reaction, a solvent along with a catalyst is used. $R=-C(CO_2CH_2CH_3)$, solvent=dichloromethane, [M]=Grubbs catalyst.

Figure 3:
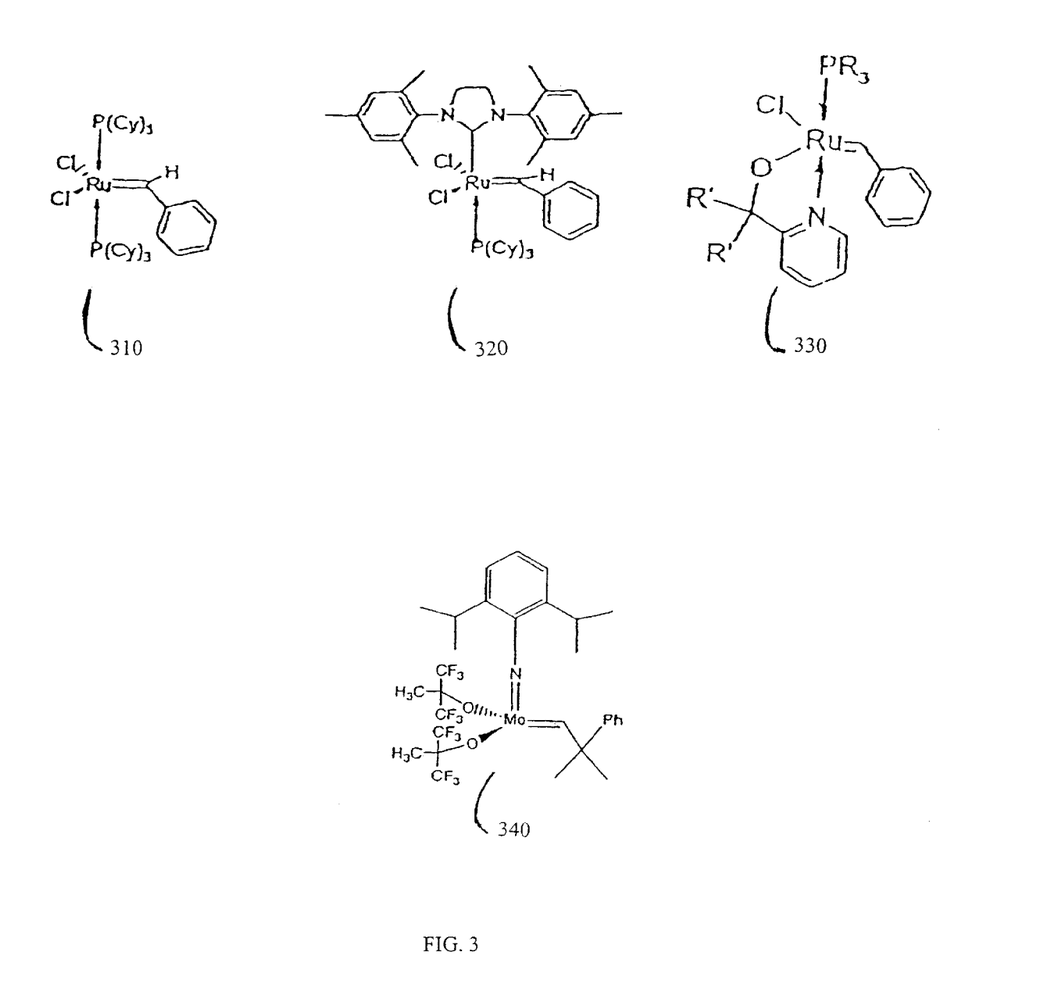
FIG. 3 illustrates some useful catalysts for solid state metathesis chemistry, according to the invention.

A variety of catalysts can be used with the solid state metathesis conversion. Metathesis catalysts have the general formula LnM=-R, wherein Ln represents a ligand set, M represents a transition metal, and -R represents a hydrocarbon group. Particularly useful solid state metathesis catalysts are those containing late transition metals, such as ruthenium and molybdenum. In a preferred embodiment, the catalyst is selected from the first generation Grubbs catalyst, the second generation Grubbs catalyst, a Van der Schaaf catalyst or Schrock's catalyst, the structures of which are illustrated shown in FIG. 3 as 310, 320, 330 and 340 respectively. In FIG. 3, P is phosphine, Cy is cyclohexyl, and Ph is phenyl. The first and second generation Grubbs catalysts are representative of the most common catalysts currently used in conventional metathesis chemistry.

Chain limiting reagents may also be used with the invention to limit polymer molecular weight. For example in ADMET chemistry, it may be desirable to limit the molecular weight below a predetermined maximum value. Chain limiters generally function by adding a functional end group which is not metathesis active. For example, as applied to the ADMET reaction of 1,9 decadiene, 1-hexene, can be added as a chain limiter, since 1-hexene, unlike 1,9 decadiene, has only one double bond.

Quench catalysts may also be used with the invention. In some polymerization reactions, the polymerization reaction can reverse and result in the polymer molecular weight decreasing as reaction time increases due to the catalyst action. This process is sometimes referred to as "back-biting". Quench catalysts can be used to reduce or limit the catalyst from back-biting, resulting in higher molecular weight products. For example, ethyl vinyl ether can be used to quench various metathesis catalysts.

It is also anticipated that the invention can increase the lifetime of certain metathesis catalysts. For example, assuming the catalyst is air sensitive, the invention will generally isolate the catalyst from the air because the catalyst will generally be bound inside a protective hydrocarbon. Longer catalyst lives tend to improve the economics of chemical reactions.

The invention can also be used with other metathesis reactions, such as RCM, ROMP and selective cross metathesis. In the case of RCM and selective cross metathesis reactions, evolution of small volatile molecules as shown in FIG. 1 and FIGS. 2(a) and (b), such as ethylene, permits removal of the small volatile molecule to drive the reaction equilibrium to form additional solid product. RCM chemistry has a wide array of the pharmaceutical industry applications, since many pharmacologically active substances are ringed structures. The invention can permit creation of single step ringed structures using RCM without a solvent. As a result, the purity and yield of products produced can be expected to be enhanced. In addition, solid-state RCM chemistry offers the opportunity of producing large cyclic molecules never before created by current techniques, given that the topological control of the solid state can lead to better reaction chemistry.

The invention has many other useful applications. For example, many macromolecular polymeric backbones result in insolubility during the early stages of a polymerization process. These polymers which become insoluble early in a polymerization are commonly referred to intractable polymers. As a consequence, liquid polymerizations of these materials often cease prematurely giving low molecular weight structures or intractable powders that cannot generally be used further. Solid-state metathesis chemistry can be used to substantially obviate this problem. Instead of polymerizing in solution or otherwise with the monomer in the liquid state, a sample of monomer and an appropriate catalyst can be cast onto a surface, such as a mold, preferably without including a solvent. Alternatively, the monomer can be introduced into a solvent solution and the solvent removed prior to the metathesis chemistry. For example, some solvents may be removed by a freeze drying process.

In either case, solid-state metathesis polymerization could then occur in situ, evolving a highly volatile small molecule, such as ethylene. This permits production of the desired polymer in place rather than having it precipitate from solution. This aspect of the invention may be particularly useful for polymerizations in the conjugated polymer field. For example, it will be possible to polymerize divinylbenzene into its polymer, polyphenylene vinylene (PPV), and cast into a desired shape using a mold, for example. PPV is known to be a highly insoluble, intractable polymer and is made via indirect routes that involve multiple steps and are plagued by processing problems in the end product. The invention which provides solid-state metathesis chemistry offers a method for avoiding the above difficulties.

The invention may also enable single crystal solid state metathesis polymerization with accompanying evolution of a small volatile molecule. For this to occur, diffusion of functional groups must generally occur. For example, if ethylene is evolved, ethylene must be diffused from the single crystal, possible by reacting as it moves out of the crystal.

EXAMPLES

A series of experiments were conducted by mixing the monomer 1,9 decadiene with a catalyst. In each experiment, a sample of 1,9-decadiene in its liquid state was combined with the catalyst in a 500:1 ratio and allowed to polymerize at room temperature (about 25° C.). Time was recorded from the instant the monomer 1,9 decadiene was mixed with the catalyst. Relative molecular weights of the polymers formed were determined by gel permeation chromatography (GPC).

Figure 4A:
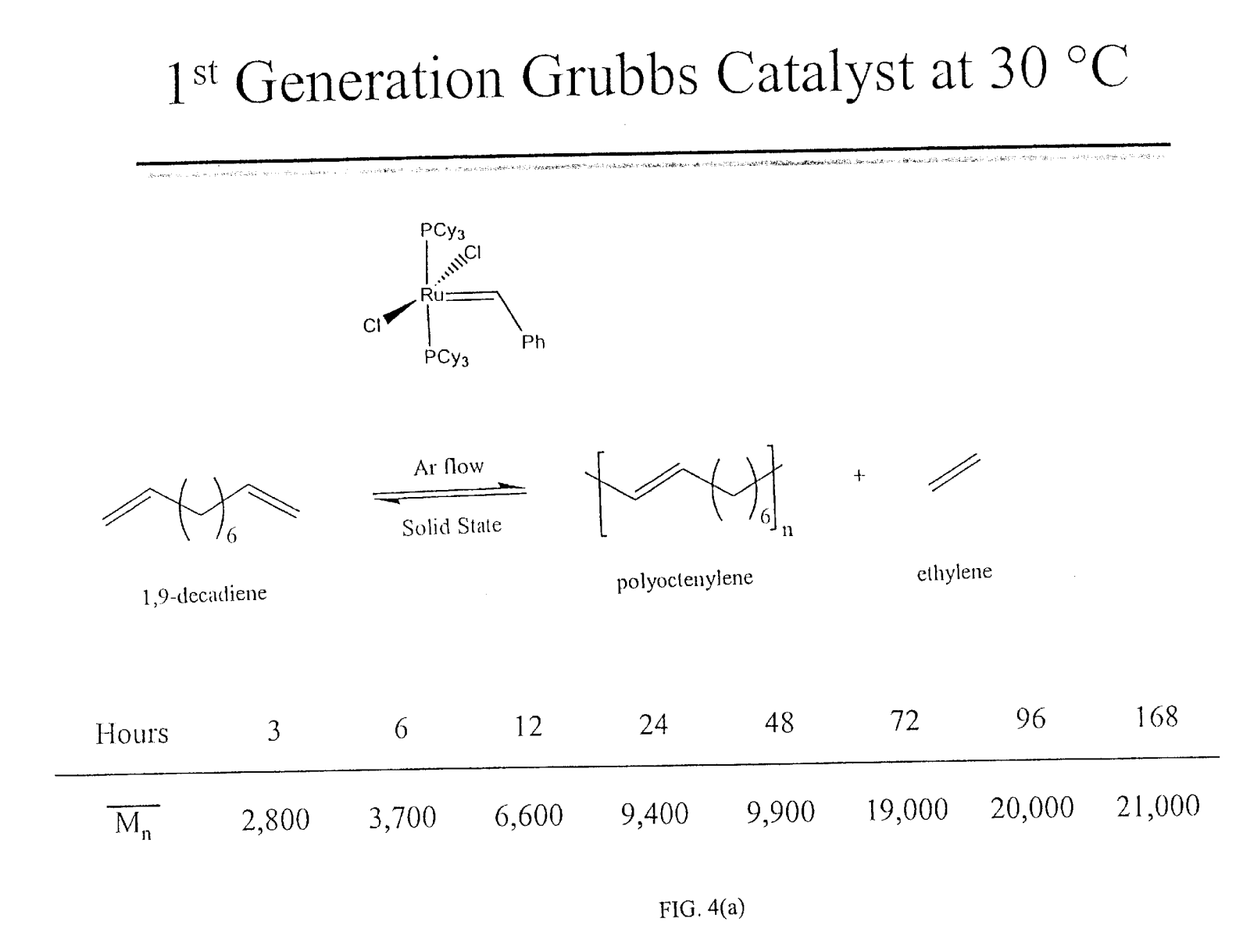
FIGS. 4(a) and (b) show the average polymer molecular weight obtained as a function of reaction time from the solid state ADMET reaction of the monomer 1,9 decadiene in the presence of the first generation Grubbs catalyst at 30° C. and 45° C., respectively.
Figure 4B:
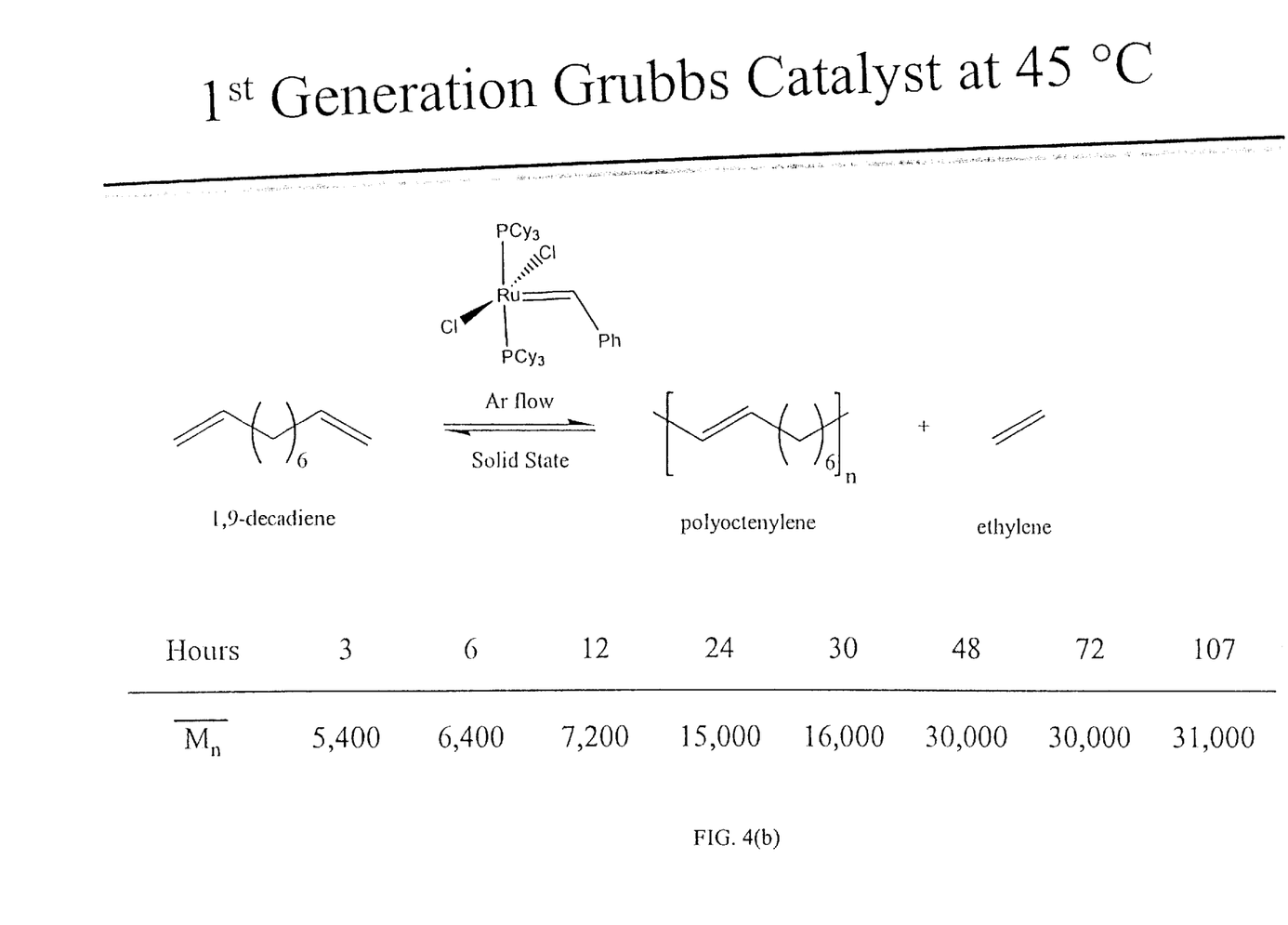

FIGS. 4(a) and (b) show the average polymer molecular weight obtained as a function of reaction time for the solid state ADMET reaction of 1,9 decadiene in the presence of the first generation Grubbs catalyst at 30° C. and 45° C., respectively. The data shows the average molecular weight increases with time and temperature. Significantly, a solid state is achieved in a time considerably less than three hours as evidenced by the average molecular weight data in FIG. 4(a) being 2,800 Daltons after 3 hours. Thus, the solid state exists during a portion of the first three hours and for the balance of the polymerization process. FIG. 4(b) shows that an even faster reaction rate is obtained at 45° C. as compared to the 30° C. data shown in FIG. 4(a).

Figure 5A:
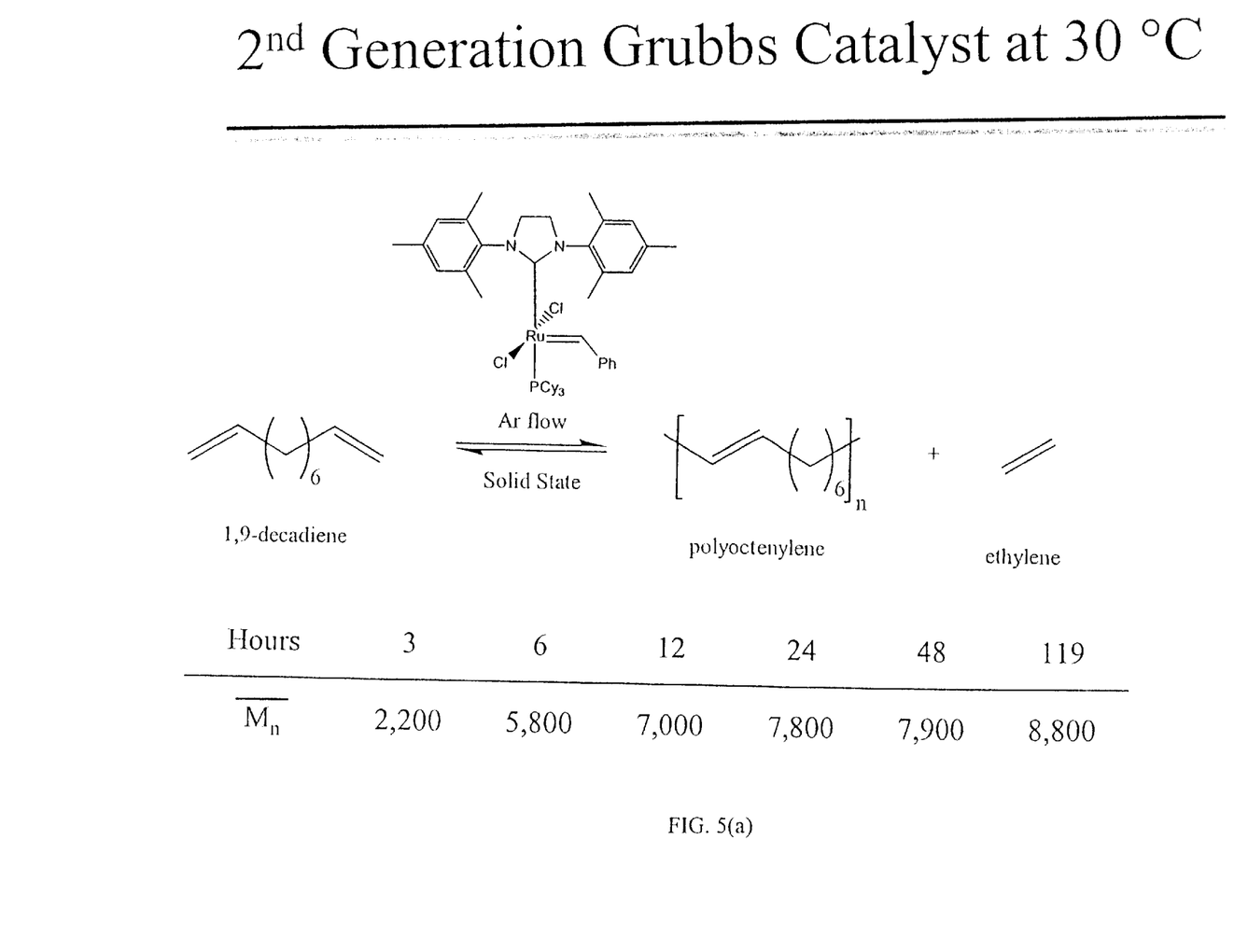
FIGS. 5(a), (b) and (c) show the average polymer molecular weight obtained as a function of reaction time from the solid state ADMET reaction of the monomer 1,9 decadiene in the presence of the second generation Grubbs catalyst at 30° C., 45° C. and 60° C., respectively.
Figure 5B:
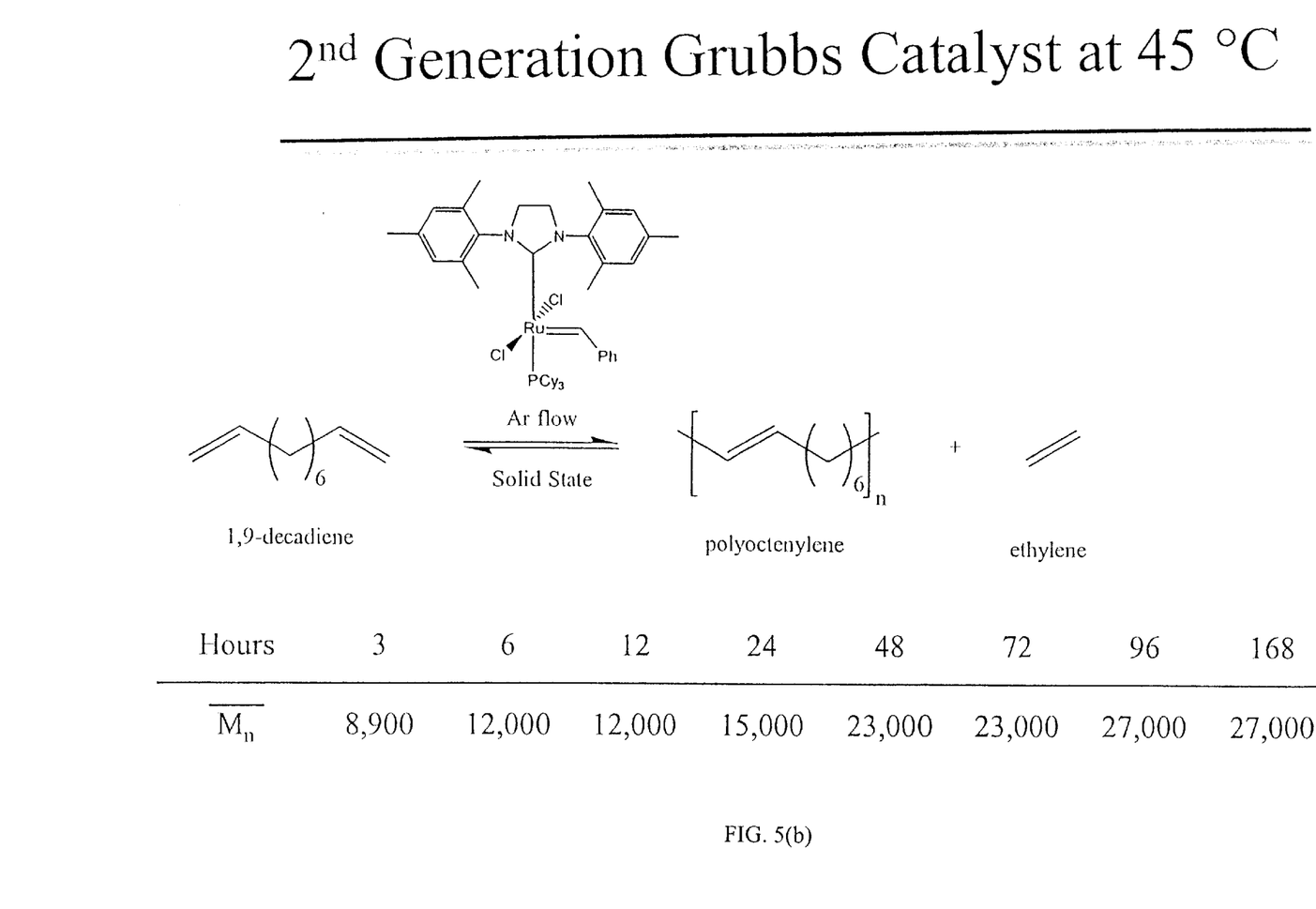
Figure 5C:
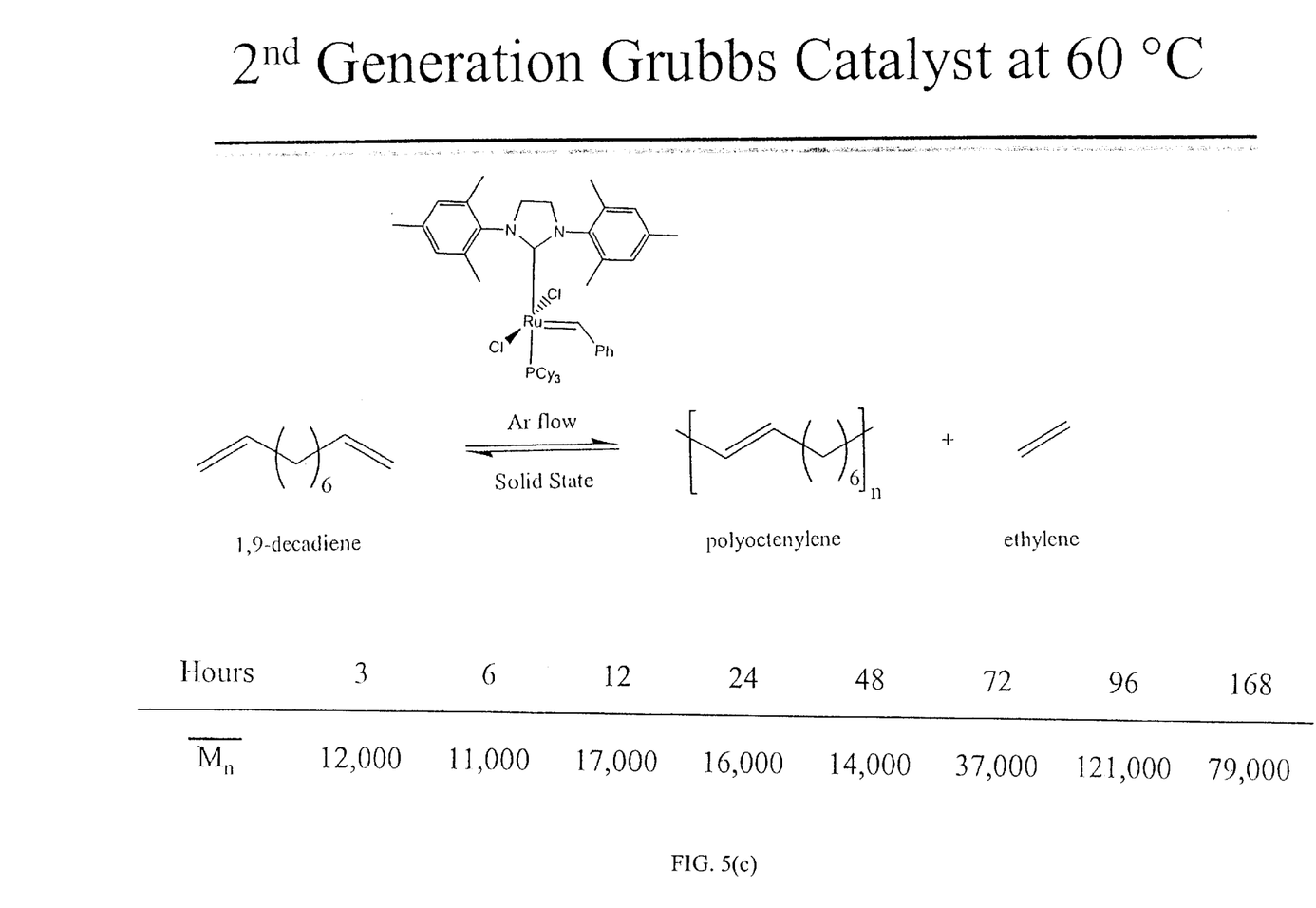

FIGS. 5(a), (b) and (c) show the average polymer molecular weight obtained as a function of reaction time from the solid state ADMET reaction of the monomer 1,9 decadiene in the presence of the second generation Grubbs catalyst at 30° C., 45° C. and 60° C., respectively. The data shows average molecular weight increases with time and temperature. As in FIGS. 4(a) and 4(b), a solid state is achieved in a time considerably less than three hours as evidenced by the average molecular weight data in FIG. 5(a) being 2,200 Daltons after 3 hours.

While the preferred embodiments of the invention have been illustrated and described, it will be clear that the invention is not so limited. Numerous modifications, changes, variations, substitutions and equivalents will occur to those skilled in the art without departing from the spirit and scope of the present invention.

We claim:

1. An in-situ method for performing organic metathesis polymer chemistry in the solid state, comprising the steps of:
providing an organic monomer and a catalyst, said catalyst for driving a metathesis polymerization reaction of said monomer, wherein said reaction produces reaction products including a polymeric end product and at least one volatile reaction product;
removing at least a portion of said volatile reaction product to favor formation of said polymeric end product, and
performing said reaction at a temperature being below an average melting point of said polymeric end product such that at least a portion of said reaction is performed in the solid phase.

2. The method of claim 1, wherein said removing step comprises passing an inert gas to carry away said volatile reaction product.

3. The method of claim 1, wherein said removing step comprises applying a vacuum to remove said volatile reaction product.

4. The method of claim 1, wherein said reaction comprises polycondensation metathesis chemistry (ADMET).

5. The method of claim 1, wherein said catalyst comprises at least one selected from the group consisting of a first generation Grubbs' catalyst, a second generation Grubb's catalyst, a Van der Schaaf catalyst and Schrock's catalyst.

6. The method of claim 1, wherein said reaction is performed at a pressure of no more than approximately 1 atmosphere.

7. The method of claim 6, wherein said reaction is performed at a temperature of no more than approximately 80° C.

8. The method of claim 6, wherein said reaction is performed at a temperature of no more than approximately 50° C.

9. The method of claim 6, wherein said reaction is performed at a temperature of no more than approximately 30° C.

10. The method of claim 1, wherein said monomer is provided as a liquid monomer.

11. The method of claim 1, wherein said reaction is performed at a temperature above the glass transition temperature of said end product.

12. An in-situ method for forming cyclic molecules by metathesis chemistry in the solid state, comprising the steps of:
providing a non-ringed reagent and a catalyst, said catalyst for driving a ring closing metathesis reaction of said reagent, wherein said reaction produces a solid cyclic product and at least one volatile reaction product;
removing at least a portion of said volatile reaction product to favor formation of said cyclic product, and
performing said reaction at a temperature being below a melting point of said cyclic product such that at least a portion of said reaction is performed in the solid phase.

13. The method of claim 12, wherein said reaction is performed at a temperature of no more than approximately 80° C.

14. The method of claim 12, wherein said reaction is performed at a temperature of no more than approximately 50° C.

15. The method of claim 12, wherein said reaction is performed at a temperature of no more than approximately 30° C.

16. An in-situ method for performing organic ring opening metathesis polymer (ROMP) chemistry in the solid state, comprising the steps of:
providing an organic ringed monomer and a catalyst, said catalyst for driving a metathesis polymerization reaction of said monomer, wherein said reaction opens said ringed monomer and forming a polymeric end product, and
performing said reaction at a temperature being below an average melting point of said polymeric end product such that at least a portion of said reaction is performed in the solid phase.

17. The method of claim 16, wherein said reaction is performed at a temperature of no more than approximately 80° C.

18. The method of claim 16, wherein said reaction is performed at a temperature of no more than approximately 50° C.

19. The method of claim 16, wherein said reaction is performed at a temperature of no more than approximately 30° C.

20. A method for in-situ polymerization by metathesis chemistry in the solid state, comprising the steps of:

providing a monomer and a catalyst for driving a metathesis polymerization reaction of said monomer on a surface, said monomer forming an intractable polymer during solution polymerization, wherein said reaction produces reaction products including a polymeric end product and at least one volatile reaction product;

removing at least a portion of said volatile reactant product to favor formation of said polymeric end product, and performing said reaction at a temperature being below an average melting point of said polymeric end product such that at least a portion of said reaction is performed in the solid phase.

21. The method of claim 20, wherein said surface comprises a mold.

22. The method of claim 21, further comprising the step of casting said polymeric end product.

23. The method of claim 20, wherein said monomer is phenylene vinylene.

24. The method of claim 20, wherein said reaction is performed at a temperature of no more than approximately 80° C.

25. The method of claim 20, wherein said reaction is performed at a temperature of no more than approximately 50° C.

26. The method of claim 20, wherein said reaction is performed at a temperature of no more than approximately 30° C.

27. The method of claim 20, wherein said reaction is performed at a temperature above the glass transition temperature of said polymeric end product.

28. A method for solid state metathesis polymerization, comprising the steps of:

providing an organic monomer having double or triple bonded end groups together with a metathesis catalyst having the formula LnM=-R, wherein Ln represents a ligand set, M represents a transition metal, and -R represents a hydrocarbon group;

polymerizing said monomer, said polymerization producing a polymeric end product and at least one volatile reaction product, and performing said polymerization at a temperature being below an average melting point of said polymeric end product such that at least a portion of said polymerization is performed in the solid phase.

29. The method of claim 28, wherein said polymerization is performed in-situ.

30. The method of claim 28, wherein said monomer is provided as a liquid monomer.

31. The method of claim 28, wherein said reaction is performed at a temperature of no more than approximately 80° C.

32. The method of claim 28, wherein said reaction is performed at a temperature of no more than approximately 50° C.

33. The method of claim 24, wherein said reaction is performed at a temperature of no more than approximately 30° C.

* * * * *